July 8, 1947.  R. C. MACKEY  2,423,784
SUGAR CONTAINER AND DISPENSER
Filed Feb. 11, 1946
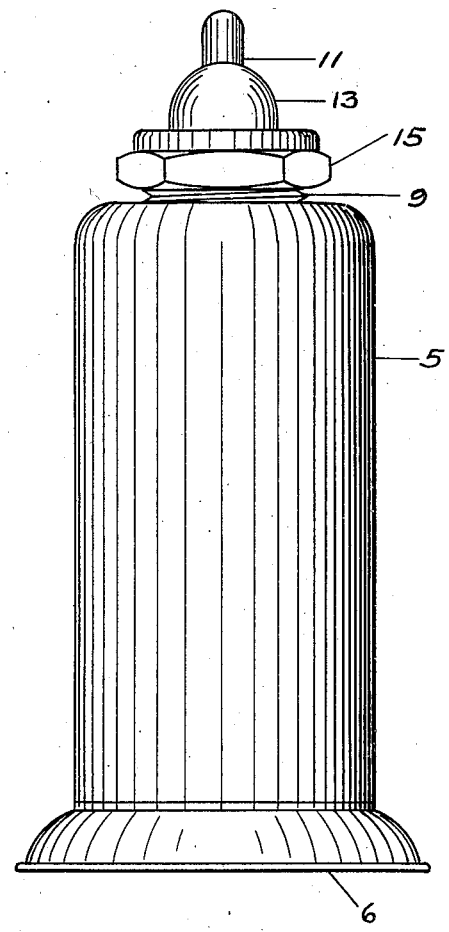
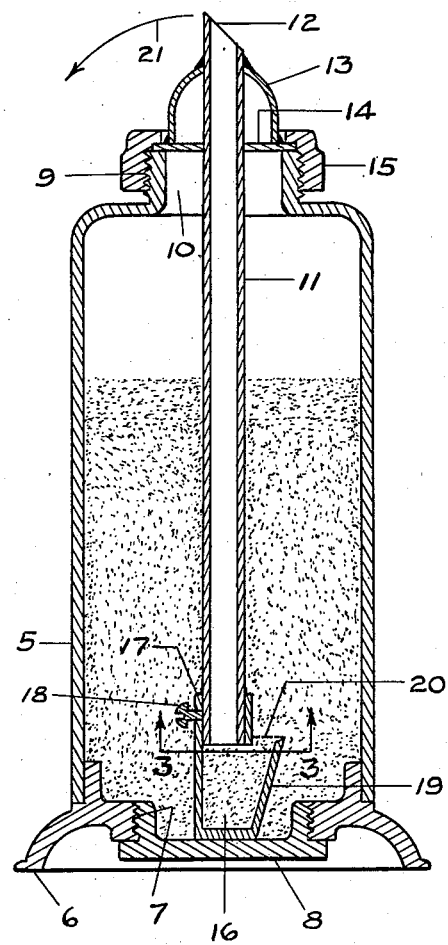
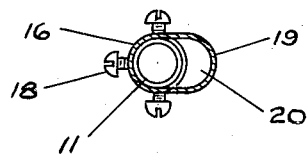
INVENTOR.
RICHARD C. MACKEY
BY Edward C. Healy
ATTORNEY Patented July 8, 1947

2,423,784

UNITED STATES PATENT OFFICE 2,423,784

SUGAR CONTAINER AND DISPENSER

Richard C. Mackey, Antioch, Calif.

Application February 11, 1946, Serial No. 646,914

1 Claim. (Cl. 222—456)

This invention relates to an improved sugar container and dispenser and particularly relates to a container of the tilting type for retaining granular materials and to a device for automatically measuring and dispensing a predetermined quantity of the same.

The principal object of the present invention is the provision of a specially constructed, improved measuring device whereby a fixed quantity of the granular material is automatically measured when the container is placed in an upright position and the same fixed quantity of material automatically dispensed when the container is tilted a certain direction into a downward position.

Another object of the invention is the provision of a tubular member that will dispense the sugar out of the center of the container, the dispensing end of the tubular member being so flared in relation to the measuring device as will indicate the direction the container must be tilted to dispense the sugar.

A further object of the invention is to removably and adjustably secure said measuring device onto the lower end portion of said tubular member whereby the volume of the measure can be varied.

A still further object of the invention is the provision of a sugar dispensing device that is so constructed as to exclude dirt and maintain the sugar in a dry and clean condition and which is simple to manufacture, superior in operation and can readily be dismantled, cleaned, and refilled whenever desired.

Other objects and advantages will be apparent during the course of the following description.

In the accompanying drawing forming a part of the specification, in which for the purpose of illustration, like numerals designate like parts throughout the same, Fig. 1 is a vertical elevational view of the device, Fig. 2 is a central vertical sectional view of the device taken on lines 2—2 of Fig. 1, looking in the direction of the arrows, illustrating the principle of the invention, and Fig. 3 is a transverse sectional view of the measureing device taken on line 3—3 of Fig. 2 looking upwardly in the direction of the arrows.

Referring in detail to the different parts and to the numerals thereof, the numeral 5 designates the container and the numeral 6 the base thereof. Said base is fixed into the bottom portion of the container and is formed with a threaded opening 7 for accommodating a threaded cap 8. The upper part of the container is formed with a threaded neck portion 9 having an opening 10.

The numeral 11 designates a central tubular member that is flared as at 12, at the uppermost end thereof and is provided with a fixed cap 13 underneath said flared portion, said cap 13 having a fixed annular plate 14 that is adapted to fit onto the top face of the neck portion 9 and cover the opening 10. The threaded recessed nut 15 fits over the outer top edge of the plate 14 and serves to retain the cap 13 and tubular member 11 in position.

The improved measuring device consists of a specially constructed miniature container designated as a whole by the numeral 16 and formed tubularly at the upper portion thereof as at 17 and is adapted to fit onto the lower end portion of the tubular member 11 and is adjustably and removably secured thereon by the set screws 18. This construction provides means whereby, obviously, the measure can be adjusted for retaining various quantities of the granular materials. The said construction enables a plurality of different types and sizes of measures to be used if desired.

It will be particularly noted in Fig. 2 that one side of the measure 16 flares outwardly from the bottom thereof as indicated at 19 and forms an opening 20 for causing the granular material to automatically fall into the measure by gravity. It will also be noted that said measure 16 is positioned onto the lower end portion of the tube 11 with said flared portion 19 disposed oppositely to the angle portion 12 formed on the upper end of said tube 11. From the construction disclosed it will be obvious that when the container 5 is tilted in the direction of the arrow 21 the granular material in the measure 16 will be dispensed through and out of the tube 11 and the granular material in the container 5 will fall past said measure, and when the container is returned to its normal upright position a portion of the granular material therein will automatically fall into and fill the measure.

It is to be understood that the form of my invention herewith shown and described is to be taken as a preferred example of the same and that various changes relative to the size, shape, material and arrangement of parts may be resorted to without departing from the spirit of the invention or the scope of the subjoined claim.

Having thus described my invention, I claim:

A device of the character described comprising a cylindrical vertical container capable of retaining a quantity of granular material, a circular externally threaded neck portion at the upper end of the container, a concentric opening through said neck portion, an elongated tubular member vertically extending through said opening and into the lower portion of the container and concentrically positioned therein, a plate secured to the upper portion of said tube and adapted to rest onto the top end of said neck and cover said opening, an internally threaded member for securing said plate onto said neck portion, the upper extremity of said tubular member being cut at an angle that points in a certain direction forming an angular spout, a measure at the lower extremity of the tubular member for receiving a quantity of the granular material from within the container, said measure being flared on the opposite side to said angular spout and in an opposite direction thereto whereby when the container is tilted in an opposite direction to the flared portion of said measure the granular material in said measure will be dispensed through said tubular member.

RICHARD C. MACKEY.

REFERENCES CITED

The following references are of record in the file of this patent:

UNITED STATES PATENTS

| Number | Name | Date |
| --- | --- | --- |
| 1,332,476 | Stough | Mar. 2, 1920 |
| 2,243,452 | Bickel et al. | May 27, 1941 |
| 1,084,530 | Bettman | Jan. 13, 1914 |
| 1,270,262 | Buckland | June 25, 1918 |
| 2,148,421 | Allan | Feb. 28, 1939 |